United States Patent
Kim et al.

(10) Patent No.: US 9,948,377 B1
(45) Date of Patent: Apr. 17, 2018

(54) SYSTEM AND METHOD FOR SPATIAL BEAMFORMING MODULATION

(71) Applicant: Mitsubishi Electric Research Laboratories, Inc., Cambridge, MA (US)

(72) Inventors: Kyeong Jin Kim, Lexington, MA (US); Yacong Ding, San Diego, CA (US); Toshiaki Koike-Akino, Belmont, MA (US); Milutin Pajovic, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/424,952

(22) Filed: Feb. 6, 2017

(51) Int. Cl.
 H04B 1/02 (2006.01)
 H04B 7/06 (2006.01)
 H04L 5/00 (2006.01)

(52) U.S. Cl.
 CPC ......... H04B 7/0617 (2013.01); H04B 7/0626 (2013.01); H04L 5/0048 (2013.01)

(58) Field of Classification Search
 CPC .... H04B 7/0617; H04B 7/0626; H04L 5/0048
 USPC ....................................................... 455/101
 See application file for complete search history.

(56) References Cited

U.S. PATENT DOCUMENTS

| 2012/0263464 | A1 | 10/2012 | Koike-Akino et al. |
| 2016/0134024 | A1* | 5/2016 | Noh ...................... H01Q 21/061 375/295 |
| 2016/0261318 | A1 | 9/2016 | Ko et al. |
| 2017/0063461 | A1* | 3/2017 | Prucnal ............ H04B 10/25752 |

FOREIGN PATENT DOCUMENTS

WO 2011104502 A2 9/2011

OTHER PUBLICATIONS

Garimella Rama Murthy, Kunal Sankhe, "Spatial Modulation—Spatial Multiplexing in Massive MIMO." https://arxiv.org/abs/1605.02969 submitted May 7, 2016.

Ding et al. "Millimeter wave adaptive transmission using spatial scattering modulation," 2017 IEEE International Conference on Communications, IEEE. May 21, 2017, pp. 1-6.

* cited by examiner

*Primary Examiner* — Sanh Phu
(74) *Attorney, Agent, or Firm* — Gene Vinokur; James McAleenan; Hironori Tsukamoto

(57) ABSTRACT

A transmitter includes a plurality of antennas for beamforming with different angles of departure (AoD), an information interface to receive a sequence of symbols including a first symbol and a second symbol and a modulator to cause the plurality of antennas to form a transmission beam with an AoD selected according to a value of the first symbol and modulated according to a value of the second symbol.

18 Claims, 11 Drawing Sheets

SYSTEM AND METHOD FOR SPATIAL BEAMFORMING MODULATION

TECHNICAL FIELD

The present invention relates to a wireless communication system, and more particularly, to a spatial modulation for increasing a transmission rate.

BACKGROUND

Millimeter Waves (mmWaves) are radio waves with wavelength in the range of 1 millimeter (mm)-10 mm, which corresponds to a radio frequency of 30 GigaHertz (GHz)-300 GHz. Per the definition by the International Telecommunications Union (ITU), these frequencies are also referred to as the Extremely High Frequency (EHF) band.

The mmWaves exhibit unique propagation characteristics. For example, compared with lower frequency radio waves, mmWaves suffer higher propagation loss, have a poorer ability to penetrate objects, such as buildings, walls, foliage, and are more susceptible to atmosphere absorption, deflection and diffraction due to particles (e.g., rain drops) in the air. On the other hand, due to the smaller wavelengths of the mmWaves, more antennas can be packed in a relatively small area, thereby allowing for the implementation of a high-gain antenna in small form factor.

The mmWaves have been less utilized than the lower frequency radio waves. A vast amount of spectrum is available in the mmWave band. For example, the frequencies around 60 GHz, which are typically referred to as the 60 GHz band, are available as unlicensed spectrum in most countries. This is one of the reasons that the mmWave spectrum has been proposed for cellular communications in the fifth generation (5G).

Several approaches have been proposed to take advantage from multiple antennas to increase data rate of wireless communication. For example, spatial multiplexing is a transmission technique in MIMO communication used to transmit independent and separately encoded data signals from each of the multiple antennas. Therefore, the space dimension is reused, or multiplexed, more than one time. However, due to large path loss in mmWave spectrum, the spatial multiplexing is impractical for the mmWaves transmission.

Spatial modulation is a transmission technique that uses an index of transmit antenna as an additional source of information to improve the overall spectral efficiency, see, e.g., WO2011104502. However, due to dense packing of antenna elements in the same aperture, the mmWave transmissions from different antennas can be indistinguishable from each other.

Accordingly, there is a need for a system and a method suitable for transmission in mmWave spectrum that can take advantage from multiple antennas to increase data rate.

SUMMARY

Some embodiments are based on understanding that the mmWaves exhibit unique propagation characteristics. For example, compared with lower frequency radio waves, mmWaves suffer higher propagation loss. However, since the wavelength is small, it is possible to pack more antenna elements in the same aperture to form a beamforming that can achieve high gains and efficient isolation to other users. On one hand, this directional beamforming makes the mmWave spectrum attractive for wireless communication. On the other hand, the beamforming makes impractical the spatial modulation method that uses an index of transmit antenna as an additional source of information.

Some embodiments are based on realization that in urban environment, the beams transmitted with different angles of departure (AoD) can result in different patterns of angles of arrivals (AoAs) of signals impinging upon the receiver array. This is because different beams with different AoDs scatter differently from the same or different objects in the environment. A pattern of AoA can be associated with the specific beam that causes this pattern. Hence, upon this pattern is received in a future, the AoD of the specific beam that causes this pattern can be readily identified.

To that end, some embodiments use spatial beamforming modulation for increasing a transmission rate. Instead of the index of transmitting antenna, the spatial beamforming modulation uses an index of AoD of a transmission beam as an additional source of information.

Some embodiments are based on recognition that spatial beamforming modulation is suitable for mmWave communication. The mmWave channel has several specific properties for propagation of mmWaves. In contrast with the lower frequency radio waves, the mmWave channel is sparse in the number of arrivals of mmWaves impinging upon the receiver array. In addition, the propagated mmWaves are spread in angular domain and can potentially exhibit a specific power profile. Such properties of the mmWave transmission increase the uniqueness of different patterns of AoAs governed by different AoDs.

In some embodiments, pilot transmission beams enable the receiver to estimate a pattern of AoAs for each index of AoD. For example, the transmitter can transmit the pilot beams to the receiver in a predetermined order and/or can include an index of AoD at each pilot transmission. Such a pilot transmission enables the receiver to perform the channel estimation. For example, the receiver can estimate a pattern of AoA for each AoD to produce a mapping between indices of different AoDs and values of the symbols. In some embodiments, the transmitter receives such a mapping from the receiver. For example, the receiver can produce such a mapping for all available AoDs. However, if the channel gains vary for different AoDs, the receiver can include a fewer number of AoDs in the mapping. In some embodiments, the transmitter select different modulation schemes based on a number of AoDs specified in the mapping.

Accordingly, one embodiment discloses a transmitter including a plurality of antennas for beamforming with different angles of departure (AoD); an information interface to receive a sequence of symbols including a first symbol and a second symbol; and a modulator to cause the plurality of antennas to form a transmission beam with an AoD selected according to a value of the first symbol and modulated according to a value of the second symbol.

Another embodiment discloses a method for transmitting symbols over a wireless communication channel. The method includes receiving a sequence of symbols including a first symbol and a second symbol; selecting an angle of departure (AoD) based on a value of the first symbol; modulating a radio frequency (RF) signal according to a value of the second symbol; and performing a beamforming to transmit the RF signal as a transmission beam with the selected AoD.

Yet another embodiment discloses a non-transitory computer readable storage medium embodied thereon a program executable by a processor for performing a method. The method includes receiving a sequence of symbols including a first symbol and a second symbol; selecting an angle of departure (AoD) based on a value of the first symbol;

modulating a radio frequency (RF) signal according to a value of the second symbol; and performing a beamforming to transmit the RF signal as a transmission beam with the selected AoD.

DETAILED DESCRIPTION

Figure 1A:
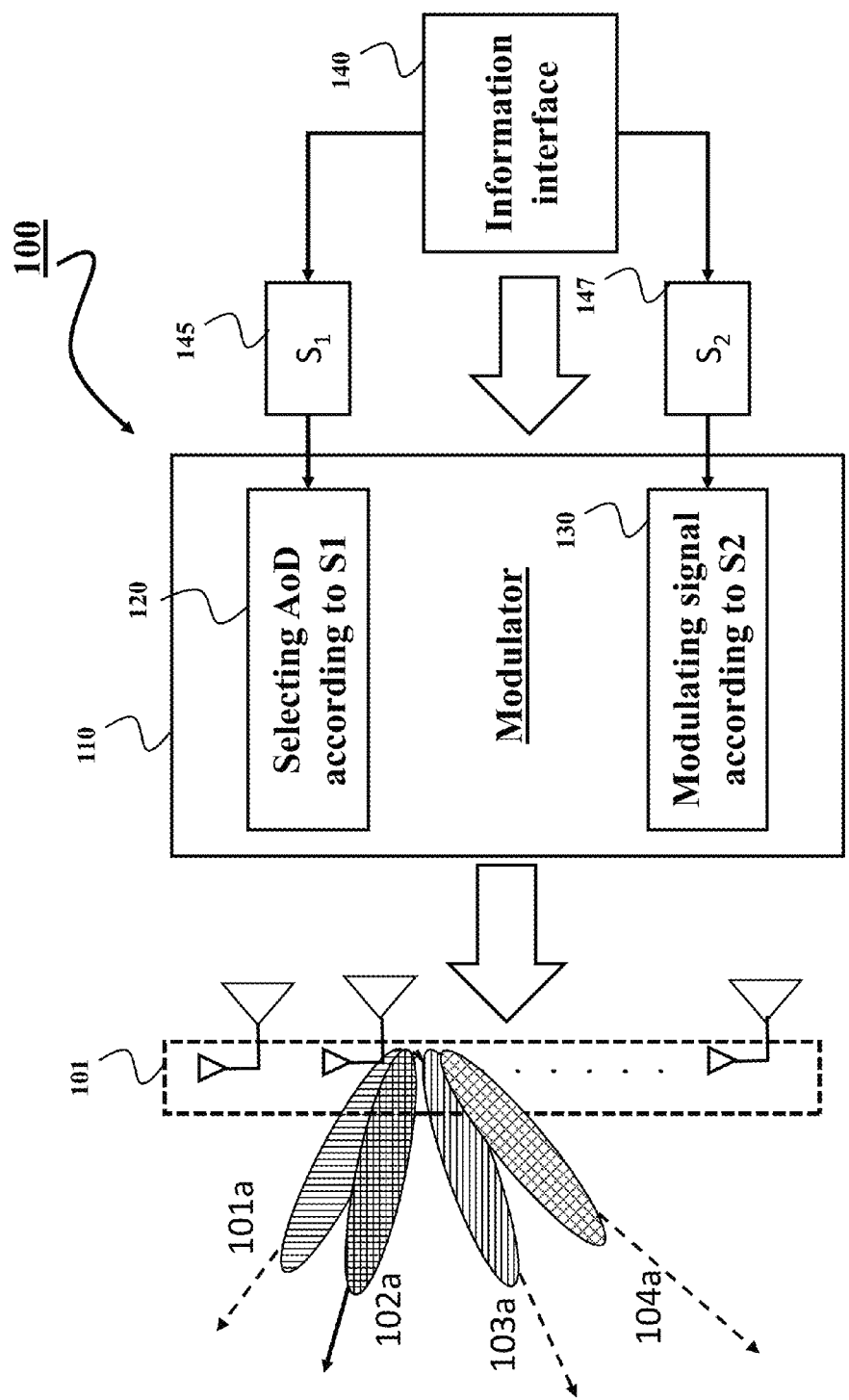
FIG. 1A shows a block diagram of a transmitter for transmitting symbols over a wireless communication channel according to some embodiments.

FIG. 1A shows a block diagram of a transmitter 100 for transmitting symbols over a wireless communication channel according to some embodiments. The transmitter 100 includes a plurality of antennas 101 for beamforming with different angles of departure (AoD) 101a, 102a, 103a, and 104a. In one embodiment, the beamforming can form one transmission beam, e.g., the beam 102a, at each point of time. The AoD can include one or combination of an azimuth angle and an altitude angle of the transmitted beam.

In some embodiments, the AoD and/or an index of the AoD is selected to convey information. To that end, different AoDs are selected based on different values of information to be transmitted. This principle is referred herein as spatial beamforming modulation. The spatial beamforming modulation uses an AoD of a transmission beam as an additional source of information.

To that end, the transmitter 100 includes an information interface 140 to receive a sequence of symbols including a first symbol 145 and a second symbol 147. For example, the information interface 140 can include a memory storing the sequence of symbols, a network interface for receiving the sequence of symbols, and/or a device for converting any type of information into the set of symbols. For example, the information interface can include a microphone for converting speech into the sequence of symbols.

The transmitter 100 includes a modulator 110 enabling the spatial beamforming modulation. The modulator 110 causes the plurality of antennas 101 to form a transmission beam with an AoD selected 120 according to a value of the first symbol 145 and modulated 130 according to a value of the second symbol 130. In such a manner, only the value of the second symbol is transmitted to a receiver. However, because the value of the second symbol is transmitted over the transmission beam with the AoD selected based on the value of the first symbol, the receiver is able to decode the values of both the first and the second symbols.

The spatial beamforming modulation increases the transmission rate by taking advantage of the multiple antennas of the transmitter and is suitable for mmWave transmission. In some embodiments, the transmitter has an access to a mapping between different AoDs and values of the symbols. This mapping is agreed with the receiver and allows the transmitter to effectively select the AoD based on the value of the first symbol.

Figure 1B:
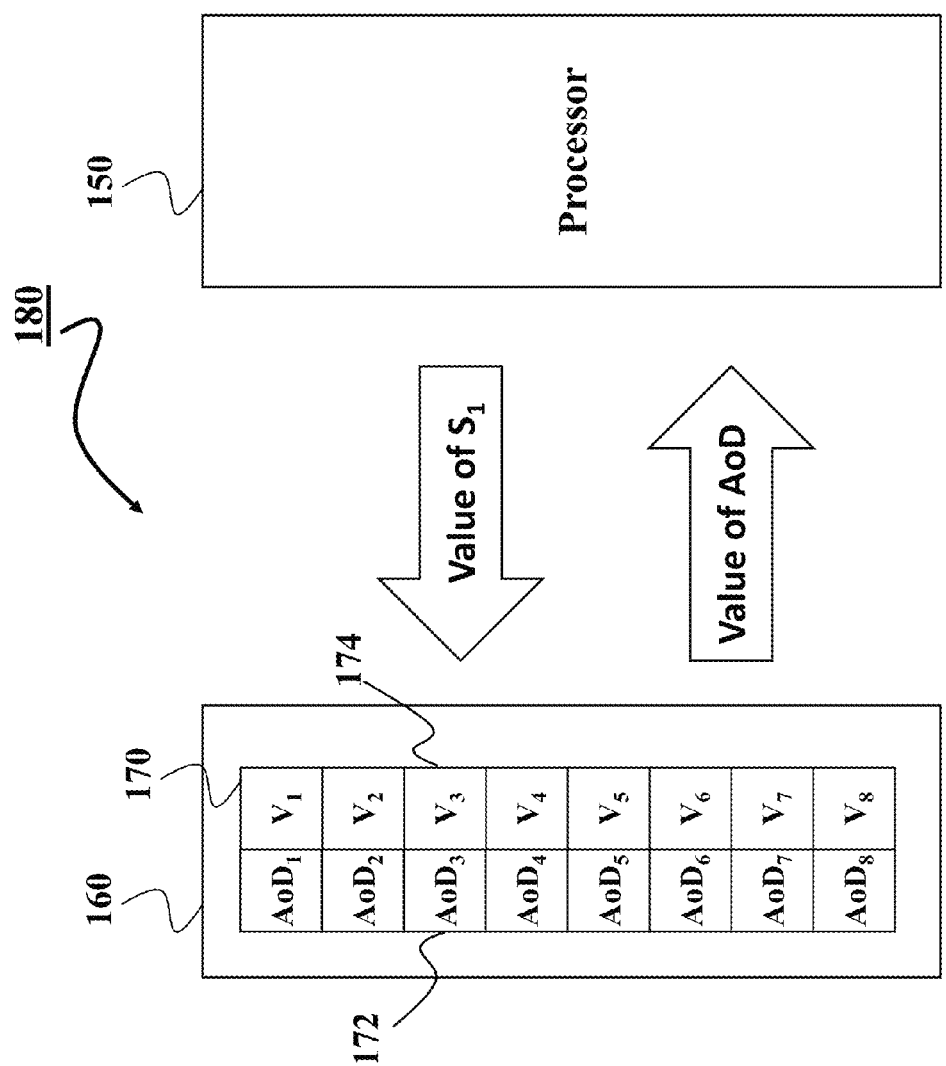
FIG. 1B shows an exemplar structure used to select angles of departure for transmitter of FIG. 1A according to some embodiments.

FIG. 1B shows an exemplar structure 180 used by the modulator 110 to select the AoD according to some embodiments. The structure 180 includes a memory 160 to store a mapping 170 between different AoDs 172 and values of the symbols 174. The structure also includes a processor 150 to select the AoD based on the value of the symbol.

In some embodiments, the mapping is predetermined and agreed with the receiver in advance. Additionally, or alternatively, the mapping can be received from the receiver and/or updated based on channel estimation between the receiver and the transmitter. For example, in some embodiments, the channel estimation is performed by the receiver in response to a pilot transmission performed by the transmitter. The receiver determines the mapping 170 based on the channel estimation and transmits the mapping 170 back to the transmitter.

Some embodiments are based on realization that in urban environment, the beams transmitted with different angles of departure (AoD) can result in different patterns of angles of arrivals (AoAs) of signals impinging upon the receiver array. This is because different beams with different AoDs scatter differently from the same or different objects in the environment. A pattern of AoA can be associated with the specific beam that causes this pattern. Hence, when this pattern is received in a future, the AoD of the specific beam that causes this pattern can be readily identified.

Figure 2:
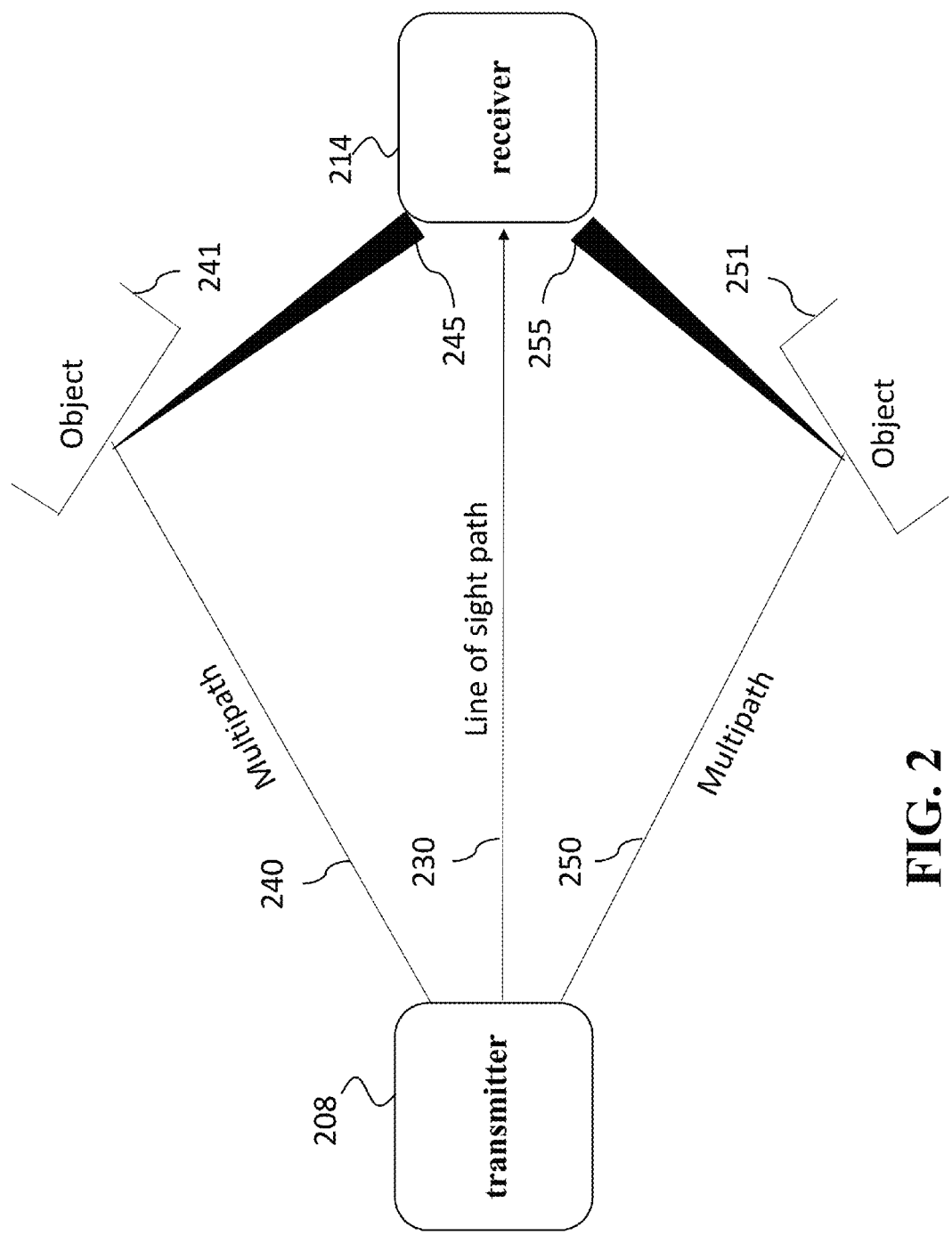
FIG. 2 shows schematic illustrating principles of propagation of the mmWaves in the mmWave channel employed by some embodiments.

FIG. 2 shows schematic illustrating principles of propagation of the mmWaves in the mmWave channel employed by some embodiments. For example, a signal sent from the transmitter 208 reaches the receiver 214 via few paths 230, 240 and 250. Since the wavelengths of the electro-magnetic waves in the mmWave system are likely comparable with the roughness of the object 241, 251 surfaces that bounce off the waves, the arrivals at the receiver are likely spread in the angular domain 245, 255. This feature has been confirmed in a number of reported measurement campaigns and is part of the existing standard IEEE 802.11ad for indoor mmWave communications at 60 GHz. Some embodiments exploit this observation to devise an enhanced channel estimation method. Some embodiments are based on recognition that the mmWaves propagating in the mmWave channel are spread upon arrivals and departures, such that the mmWaves are detected as clusters of the mmWaves at the receiver forming a pattern of AoAs.

Figure 3:
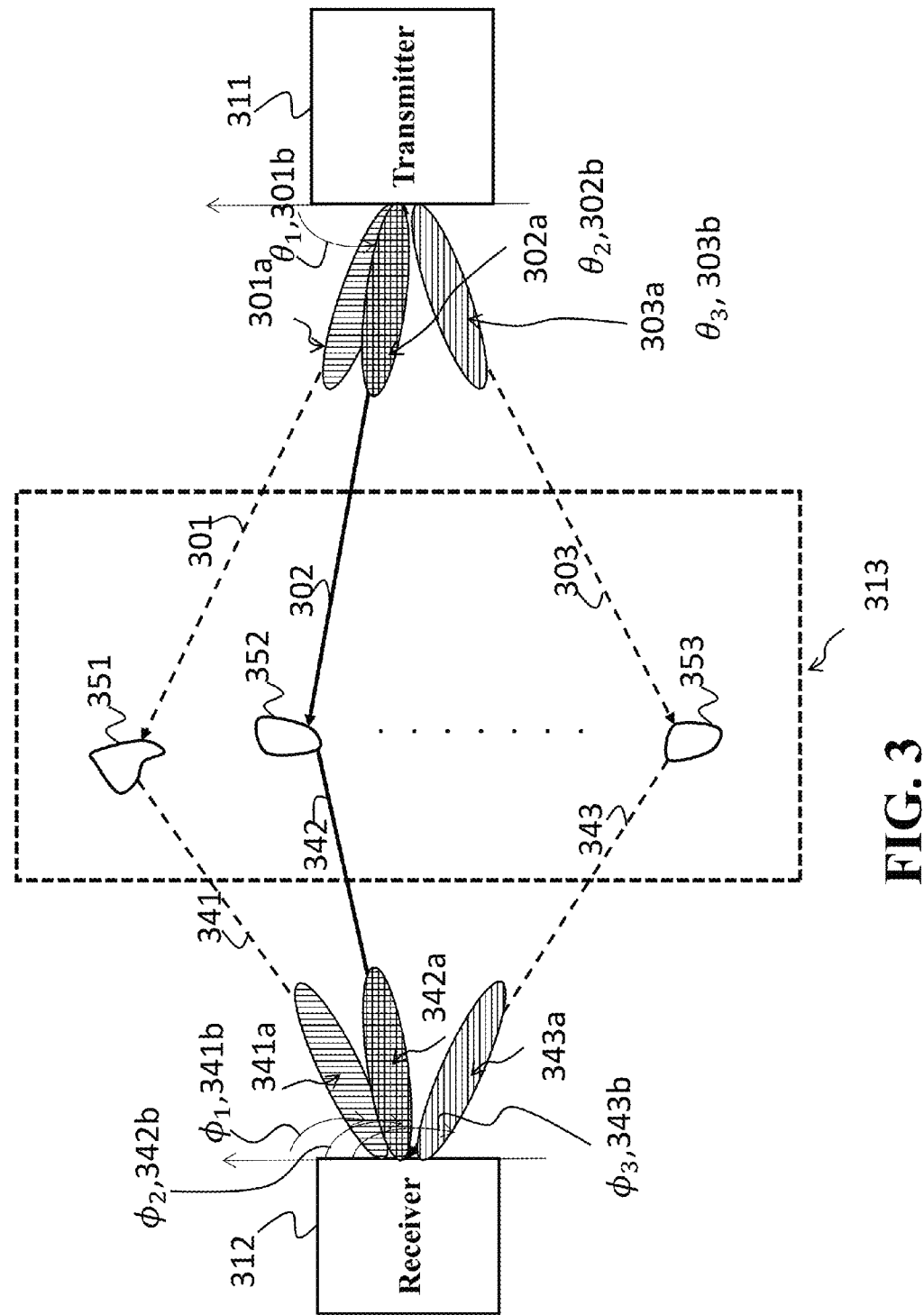
FIG. 3 shows a schematic of transmissions through a set of scattering clusters according to some embodiments.

FIG. 3 shows a schematic of transmissions from a transmitter 311 to a receiver 312 through a set of scattering clusters 351, 352, 353 according to some embodiments. Examples of the scattering clusters 351, 352, 353 can include walls of the buildings in the environment 313 connecting the transmitter and the receiver. In some situations, there are no direct paths connecting the transmitter to receiver due to line of sight signal (LOS) blocking by the scattering clusters. In another embodiment, direct path with higher power is also used for communications as an additional path.

Using an antenna array, the transmitter forms directional beams, 301a, 302a, 303a through directions, 301, 302, 303 redirected from the scattering clusters 351, 352, 353. To point an antenna array and shape the beam, some embodiments used AoDs 301b, 302b, 303b selected based on some values of transmitted symbols. When the signals are reflected from scattering clusters, the received signal through the receiving directions, 341, 342, 343 can be identified by steering the corresponding receiving beams 341a, 342a, 343a with corresponding angle of arrival (AoA), 341b, 342b, 343b.

In some embodiments, the receiver detects the AoA of the path with the strongest gain. For example, the receiver can associate the beam 302a with the AoD 302 to correspond to the AoA 342b. Additionally or alternatively, the receiver can perform the channel estimation to determine a pattern of AoAs of multiple signals resulting from the transmission of a single beam such as the beam 302a. To that end, the information bits can be modulated not only on the transmitted symbol, but also on the transmission directions to encode additional bits.

For example, there are $N_s$ scattering clusters for spatial scattering modulation (SSM), and M-ary constellation for symbol modulation. In one embodiment, for each transmission, the first $\log_2(N_s)$ bits are used to decide which direction to transmit, and the next $\log_2(M)$ bits are used to decide which point in the constellation to use. At the receiver side, the maximum likelihood detection can be used to decode the symbol as well as the transmission direction. When transmission direction is correctly decoded, additional bits are encoded in the direction, i.e., the first $\log_2(N_s)$ bits.

In some embodiments, the modulator causes the plurality of antennas to perform pilot transmission with transmission beams having different AoDs to enable at least one receiver to estimate a pattern of arrival impinging upon antennas of the receiver for different transmission beams. For example, the pilot transmissions can be performed in the order of indexes of AoDs. Additionally, or alternatively, in some embodiments, each pilot transmission beam includes an index of the AoD.

Some embodiments use compressive channel estimation or beam steering to estimate AoD and AoA at the transmitter and receiver. For a uniform linear array (ULA), the array manifold vectors are given by $$a_t(\theta_l) = \frac{1}{\sqrt{N_t}}\left[1, e^{j2\pi\Phi_l^t}, \ldots, e^{j2\pi(N_t-1)\Phi_l^t}\right]^T,$$

$$a_r(\phi_l) = \frac{1}{\sqrt{N_r}}\left[1, e^{j2\pi\Phi_l^r}, \ldots, e^{j2\pi(N_r-1)\Phi_l^r}\right]^T,$$

where $$\Phi_l^t \equiv \frac{d_t}{\lambda}\sin(\theta_l)$$

and $$\Phi_l^r \equiv \frac{d_r}{\lambda}\sin(\phi_l),$$

with antenna spacing $d_t$ and $d_r$ at the transmitter and receiver, respectively. Here, $\lambda$ is the wavelength of the propagation. The numbers of antenna elements at the transmitter and receiver are, respectively, given by $N_t$ and $N_r$. When $N_t$ and $N_r$ are large, which is valid in our architecture, we have asymptotically $a_t(\theta_l)^H a_t(\theta_k) \approx 0$, $\forall l \neq k$, and $a_r(\phi_l)^H a_r(\phi_k) \approx 0$, $\forall l \neq k$. Thus, AoA and AoD are nearly orthogonal each other. In one embodiment, the antenna elements are aligned in a free-form position not in uniform linear manner to improve the spherical spatial resolution.

For $N_{T_s}$ scattering clusters, the channel matrix from the transmitter to receiver is modeled by the narrowband discrete channel as:

$$H = \sum_{l=1}^{N_{T_s}} \beta_l a_r(\phi_l) a_t(\theta_l)^H,$$

where $\beta_l$ denotes the gain of the lth path, and $\theta_1$ and $\theta_1$ are respectively azimuth AoD and AoA of the lth directional path.

Some embodiments of the invention are based on recognition that the mmWaves propagating in the mmWave channel are spread upon arrivals and departures, such that the mmWaves are detected as clusters of the mmWaves at the receiver. Due to the clustering, the statistics of the paths of mmWaves include statistics on locations of the clusters in a space of propagation of the mmWaves, and the statistics on the spread of mmWaves include statistics on a spread density of the cluster.

Figure 4:
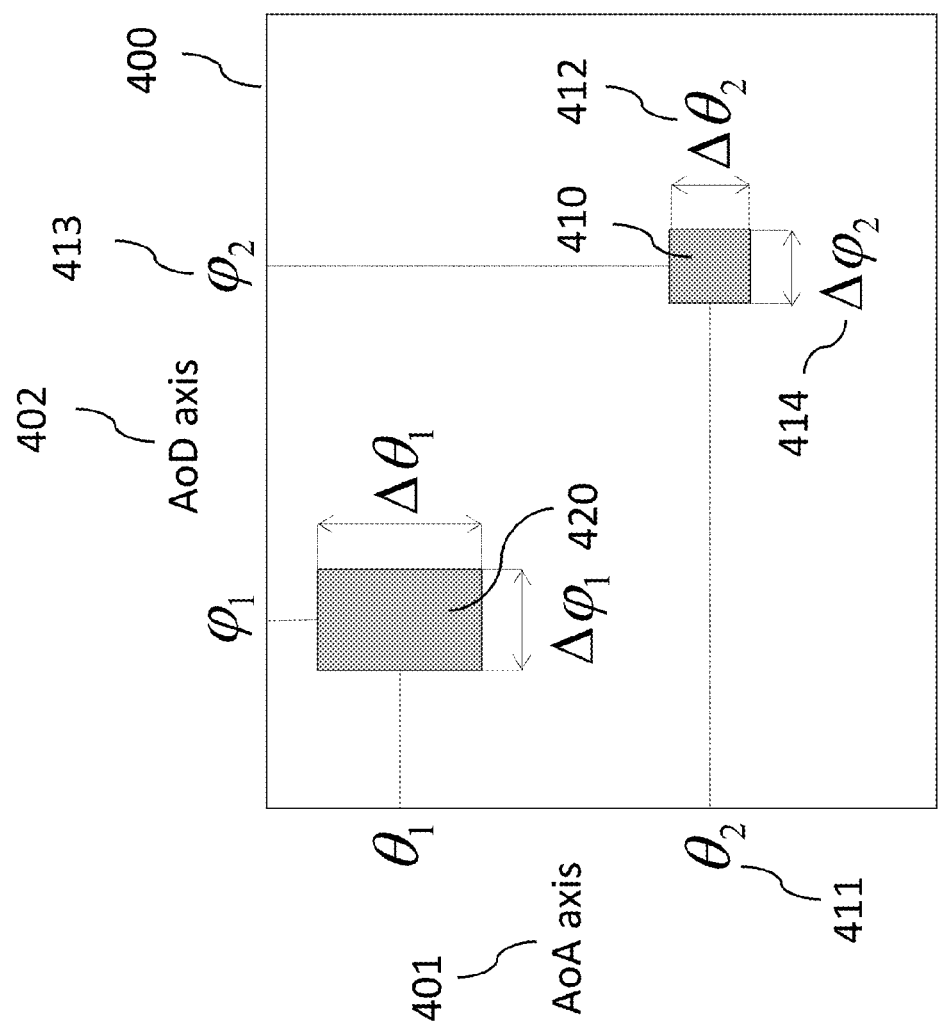
FIG. 4 shows a schematic of various metrics of statistics in the space of propagation of the mmWaves according to some embodiments of the invention.

FIG. 4 shows a schematic of various metrics of statistics in the space of propagation of the mmWaves according to some embodiments of the invention. For example, the space of propagation of the mmWaves can be represented as a Carterisan product of the set of possible angles of the AoDs of the mmWaves and angles of the directions of AoAs of the mmWaves.

For example, one domain of the space of propagation in mmWave channel is a virtual angular domain, pictorially shown in FIG. 4 in the case where, without loss of generality, both transmitter and receiver employ vertical line arrays of antennas.

To arrive to a virtual angular domain representation of a channel in this specific example, we first assume that channel between each transmitter antenna element and each receiver antenna element is a flat fading channel, and thus represented via a single complex gain. All complex gain coefficients, corresponding to all possible pairs of transmitter and receiver antenna elements, are formatted into a channel matrix H, such that (i,j) entry in H represents a channel gain between the $i^{th}$ antenna element on the receiver side and the $j^{th}$ antenna element on the transmitter side.

The channel matrix H can be represented as $$H = A(\Theta_{rx}) H_s A(\Theta_{tx})^H, \quad (1)$$

where $\Theta_{tx} = [\theta_{tx,1}, \ldots, \theta_{tx,n_{tx}}]$ and $\Theta_{rx} = [\theta_{rx,1}, \ldots, \theta_{rx,n_{rx}}]$ are possible AoDs and AoAs of the propagation paths in the channel, and $A(\Theta_{rx})$, $A(\Theta_{tx})$ are matrices whose columns $\{a(\theta_{tx,i})\}_{i=1}^{n_{tx}}$, $\{a(\theta_{rx,i})\}_{i=1}^{n_{rx}}$ are manifold vectors corresponding to the respective AoD and AoA. Here, $H_s$ is the virtual angular domain representation of the channel.

The virtual angular domain can be pictorially represented as a two-dimensional grid 400, representing AoA 401 and AoD 402 along the axis. A non-zero patch of energy 410 at, for example, AoA $\theta_2$ 411 and AoD $\phi_2$ 413, indicates that there is a path in a mmWave channel such that a signal transmitted in the beam in the direction $\phi_2$ and with width $\Delta\phi_2$ 414 reaches receiver from the direction of $\theta_2$ and has angular spread $\Delta\theta_1$ 412. The virtual angular representation of a mmWave channel shown in FIG. 4 indicates that there are two paths 410 and 420 between transmitter and receiver where each transmitted and received beam has some angular spread.

Because the mmWave channel is sparse in the number of paths between transmitter and receiver, some embodiments formulate the channel estimation problem as a problem of sparse representation of the received channel sensing signals in a redundant dictionary. The redundant dictionary includes atoms which depend on the transmitter and receiver manifold vectors. To that end, the channel can be estimated by employing one of a variety of sparse recovery methods, such as orthogonal matching pursuit (OMP) method.

Figure 5:
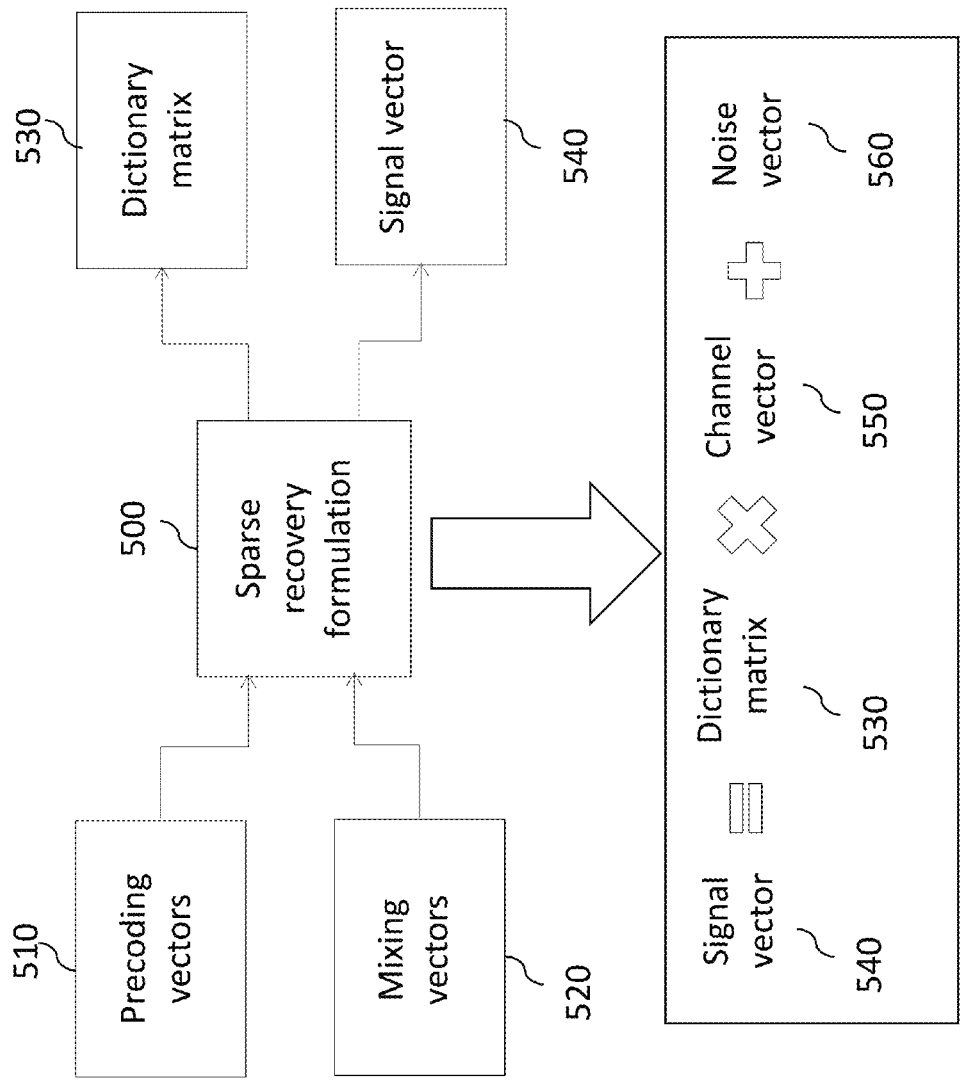
FIG. 5 shows a block diagram of a sparse recovery method of the channel estimation performed by the receiver according to one embodiment.

FIG. 5 shows a block diagram of a sparse recovery method of the channel estimation performed by the receiver according to one embodiment. The signal vector 540 can be obtained after pre-processing the test symbol received on a receiver array. The signal vector is represented as a product of a wide dictionary matrix 530 and a sparse channel vector 550, modified with noise 560. This representation can be obtained by transmitting a test symbol, e.g., a symbol with a known value one, after precoding the test symbol using a certain number of precoding vectors 510 and processing the received signal with a certain number of mixing vectors 520.

In some embodiments, non-zero elements of the channel vector include the coefficients of the channel state information, wherein values of the signal vector and the dictionary matrix are known from the test symbol and transmitter and receiver manifold vectors. For example, one embodiment determines the dictionary matrix and the signal vector from the precoding and mixing vectors, as well as transmitter and receiver manifold vectors, using various algebraic operations which encompass sparse recovery formulation 500.

For example, suppose a transmitter sends a data symbol t=1 and applies precoding vectors $\{p_i\}_{i=1}^m$ in m successive time steps. The precoding vectors are of size equal to the number of transmitter antenna elements and, in general, may contain random or pseudo-random complex exponentials. The receiver employs corresponding mixing vectors $\{q_i\}_{i=1}^m$ to the signals received on its antenna elements. The mixing vectors are of size equal to the number of employed antenna elements and may contain random or pseudo-random complex exponentials.

The $i^{th}$ observed data snapshot (i.e., signal across receiver antenna elements) is therefore given by $$y_i = \sqrt{\rho} q_i^H p_i t + q_i^H z = \sqrt{\rho} q_i^H A(\Theta_{rx}) H_s A(\Theta_{tx})^H p_i t + e_i, \quad (2)$$

where $\rho$ is the SNR, $e_i \in \mathcal{CN}(0,\sigma_n^2)$ is the measurement noise, and H, $A(\Theta_{rx})$, $A(\Theta_{tx})$ and $H_s$ are as defined in (1).

From properties of the Kronecker product, we know that for any matrices A, B, C, $$\text{vec}(ABC) = (C^T \otimes A)\text{vec}(B), \quad (3)$$

where the vec($\cdot$) operation rearranges the elements of its operand columnwise into a vector. Using (3) in (2), we get $$y_i = \sqrt{\rho}(p_i^T \otimes q_i^H)(A(\Theta_{tx})^* \otimes A(\Theta_{rx}))\text{vec}(H_s) + e \quad (4)$$

Stacking up the m data snapshots obtained in m consecutive time steps into a vector, we get:

$$\underbrace{\begin{bmatrix} y_1 \\ \vdots \\ y_m \end{bmatrix}}_{:=y} = \sqrt{\rho} \underbrace{\begin{bmatrix} p_1^T \otimes q_1^H \\ \vdots \\ p_m^T \otimes q_m^H \end{bmatrix} (A(\Theta_{tx})^* \otimes A(\Theta_{rx}))}_{:=A} \underbrace{\text{vec}(H_s)}_{:=x} + e, \quad (5)$$

where we refer to y as signal vector 540, A is dictionary matrix 530, x is channel vector 550, and e is noise vector 560. In some embodiments, the signal vector and dictionary matrix are computed from the precoding and mixing vectors, as well as from the transmitter and receiver manifold vectors. The channel estimation problem then boils down to finding a sparse representation of the signal vector 540 in the redundant dictionary 530, where the coefficients of the sparse representation constitute unknown channel vector 550. The estimated channel vector is then mapped back to the representation in the virtual angular domain $H_s$, which, in turn, is mapped to channel matrix H, using (1).

Figure 6:
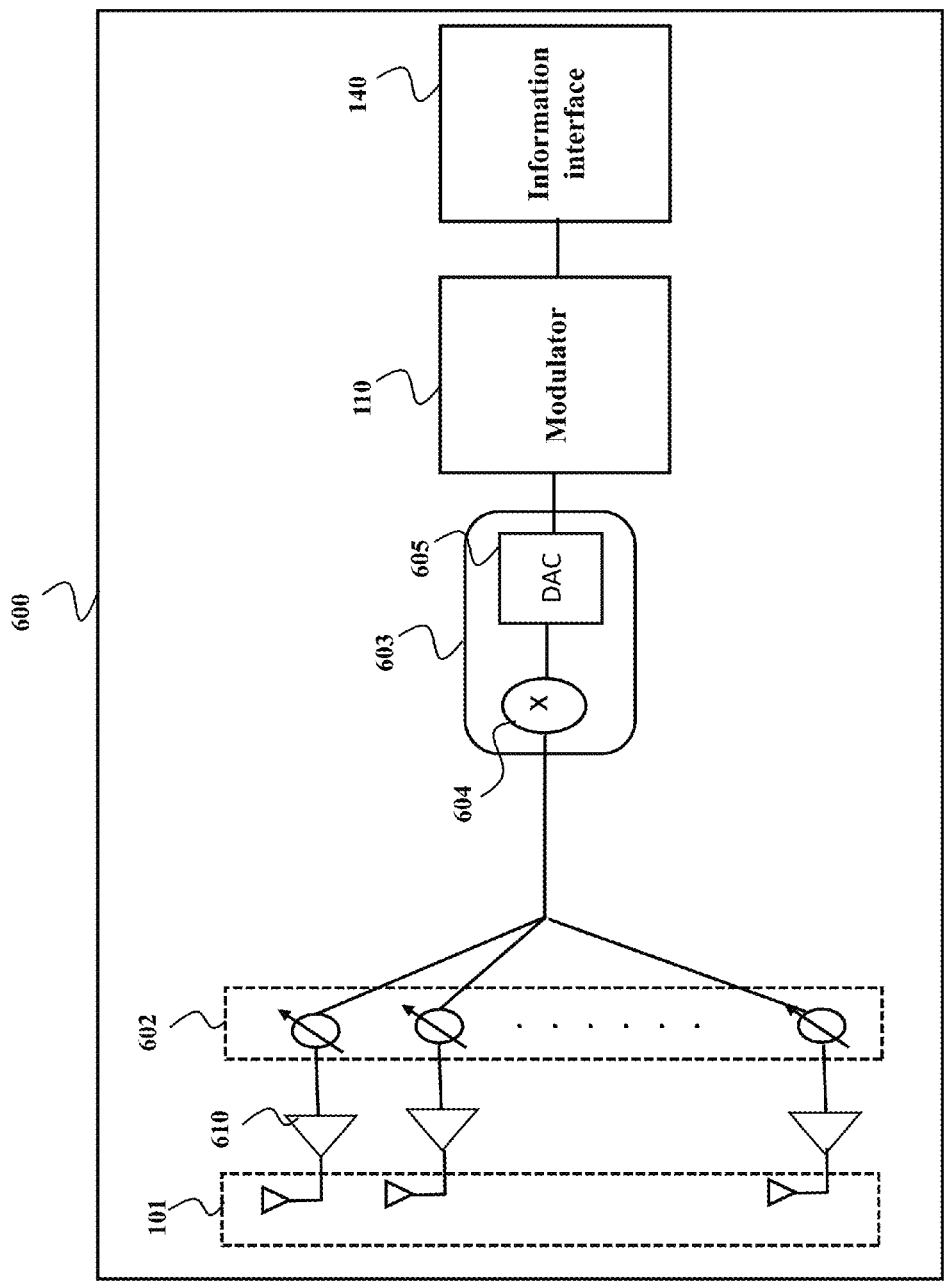
FIG. 6 shows exemplar architecture of a transmitter according to some embodiments.

FIG. 6 shows exemplar architecture of a transmitter 600 according to some embodiments. In these embodiments, the transmitter includes one or several radio frequency (RF) chains 603 to convert the modulated value of the second symbol into a RF signal of a predetermined frequency and a set of phase shifters 602 to provide a controllable phase shift of transmission of the RF signal via the plurality of antennas that forms the transmission beam having the selected AoD. For example, the modulated symbols are converted to the RF signal via digital-to-analog converter (DAC), 605, and frequency converter, 604.

In one embodiment, to save the hardware cost and power consumption, the transmitter uses only one RF chain 603. In alternative embodiment, the transmitter can be equipped with multiple RF chains and a set of phase shifter arrays. Digital beamforming requires each antenna element connected to its own RF chain, so that one main concern with the digital beamforming is the power consumption and hardware cost. In contrast, an analog beamforming and hybrid beamforming require only a limited number of RF chains, which connect an antenna array through a phase shifter array.

Additionally, or alternatively, the transmitter also includes a set of power amplifiers 610 for amplifying the RF signal. In one embodiment, the power amplifiers (PAs) amplify the RF signal with the constant rate. In alternative embodiment, the power amplifiers amplify the RF signal as a function of a gain of a channel formed by the transmission beam with the selected AoD.

The outputs of the RF chain pass thorough a phase shifter array 602 that includes $N_T$ phase shifters and PAs. The outputs of the PAs are then passing through to an antenna array 101 that includes $N_T$ antenna elements. With a large antenna array in the transmitter, some embodiments can increase a spatial resolution as well as to form a highly directional beam with a narrow beam width. In yet another embodiment, the phase shifter array 602 can also control the amplitude. This additional degree of freedom to change not only phase but also amplitude can provide even finer spatial resolution and higher antenna gains.

Figure 7:
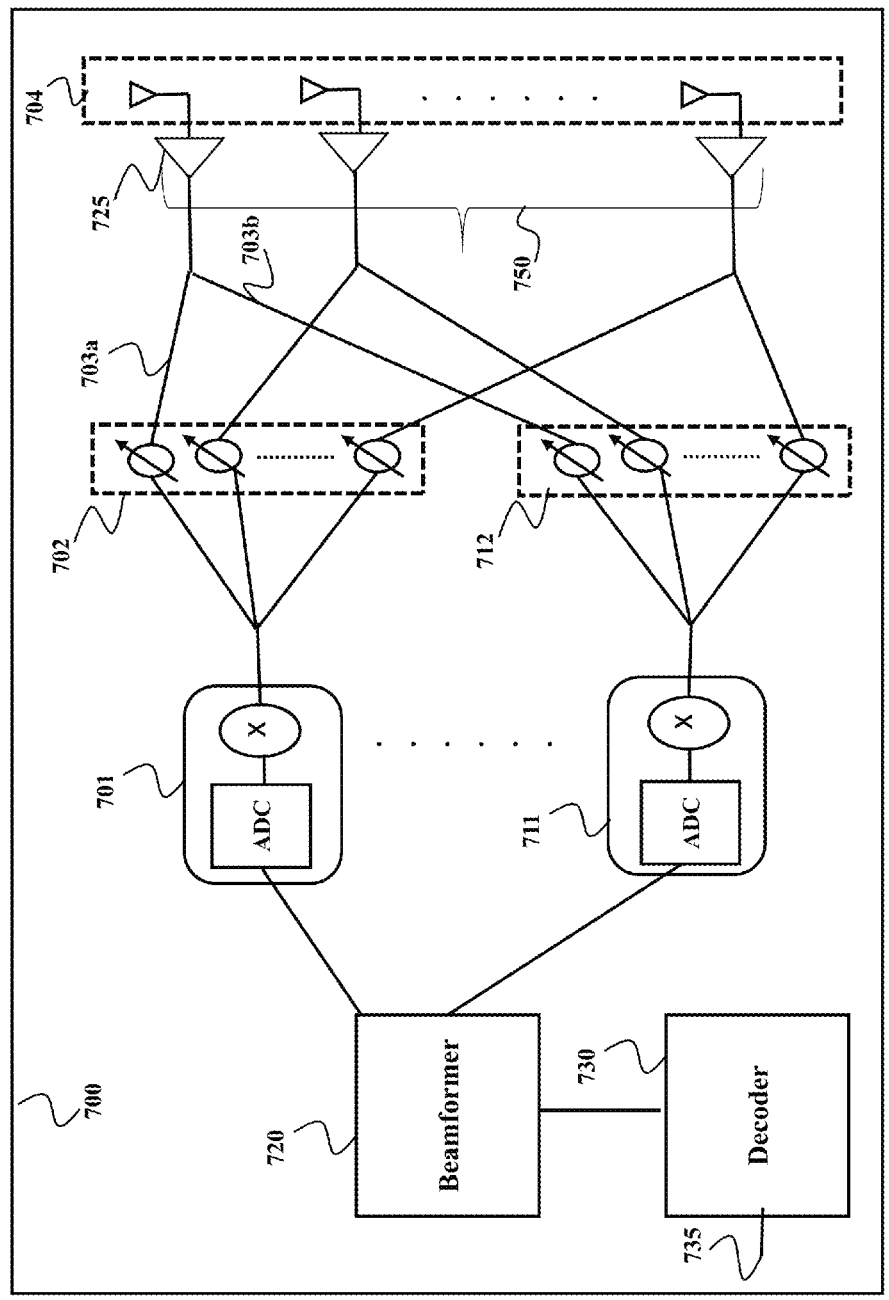
FIG. 7 shows exemplar architecture of the receiver in communication with the transmitter of FIG. 6 according to some embodiments.

FIG. 7 shows exemplar architecture of the receiver 700 in communication with the transmitter of FIG. 6 according to some embodiments. Typically, the receiver has more available hardware resources that a transmitter. For example, the receiver 700 can include one or up to N RF chains 701 and 711 each of which connects to its phase shifter array 702 and 712 that include $N_r$ phase shifters each.

In one embodiment, the phase shifter at the receiver can also control amplitude of the received signals 750. The signal from each antenna passes through the low noise amplifier (LNA) 725, and then the output signal from the LNA is split into N signals. For example, signals 703a and 703b are fed into the first phase shifter in each phase shifter array 702 and 712. Outputs from the phase shifter array 702 and 712 are fed into its connecting RF chains 701 and 711. After down conversion and passing through the analog to digital converter (ADC), the signal passes through the beamformer 720 that estimates the AoA of the received transmission beam. The final decoded information data 735 are obtained from the decoder 730 that decodes the second symbol modulated in the transmission beam and to decode the first symbol based on the AoA. Due to the use of an antenna array, the receiver can form a highly directional beam with a very narrow beam width. Also, due to full use of hybrid analog-digital structure and multiple RF chains, any combiners can be formed in the receiver.

Figure 8:
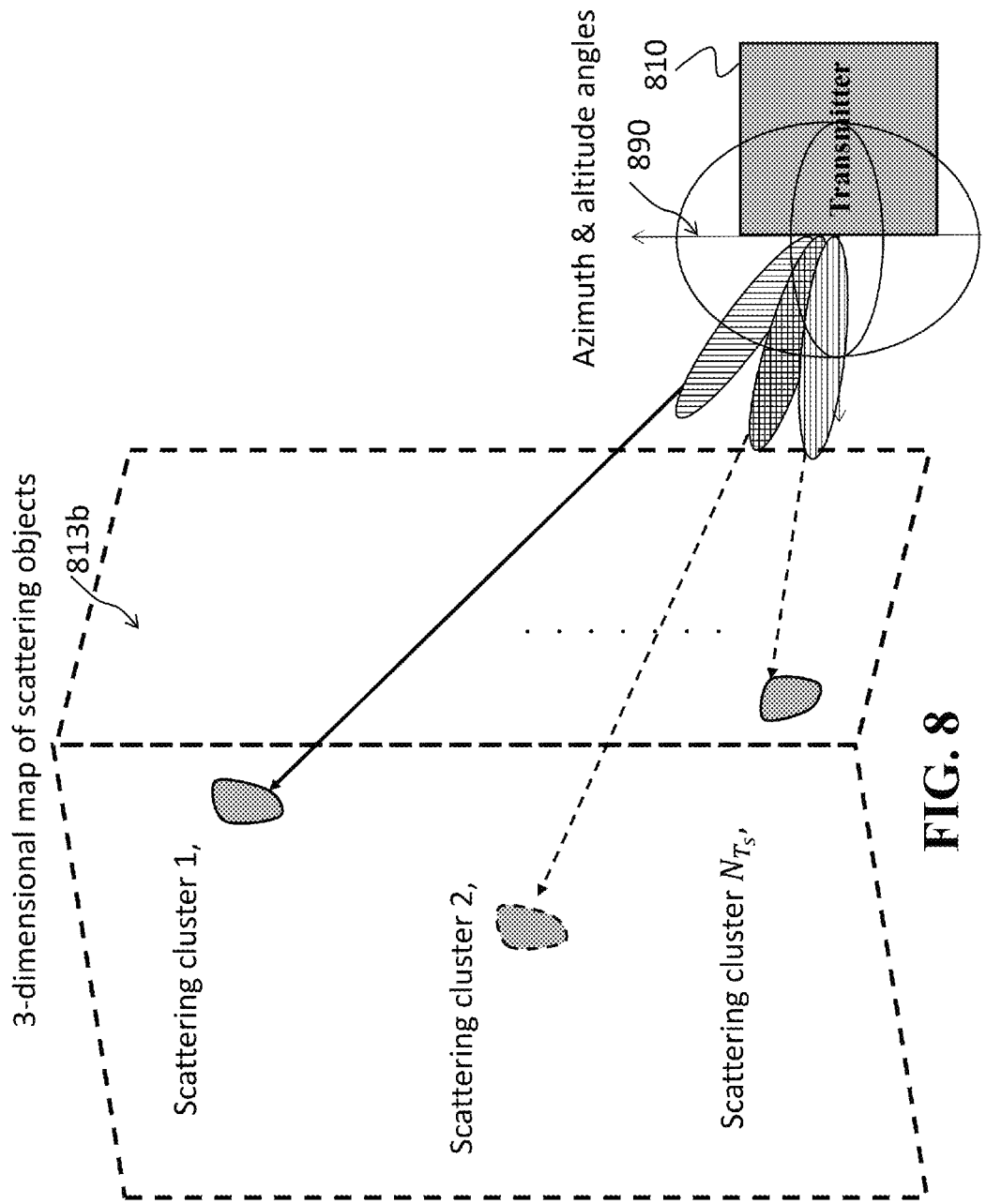
FIG. 8 shows a schematic of the communication via spatial beamforming modulation exploiting three-dimensional scattering map with azimuth and elevation angles according to one embodiment.

FIG. 8 shows a schematic of the communication via spatial beamforming modulation exploiting three-dimensional scattering map with azimuth and altitude angles according to one embodiment. In this embodiment, a transmitter 810 exploits scattering objects placed in three-dimensional geometry 813b by using spherical directions 890, which are specified by not only azimuth angle but also altitude angle. This additional degree of freedom for beamforming control can further decrease interference to undesired directions. For example, even if there are two distinct objects at the same azimuth angle, the transmitter or the receiver may still be able to use two scattering objects independently by using altitude angles.

Example of Spatial Beamforming Modulation

Figure 9:
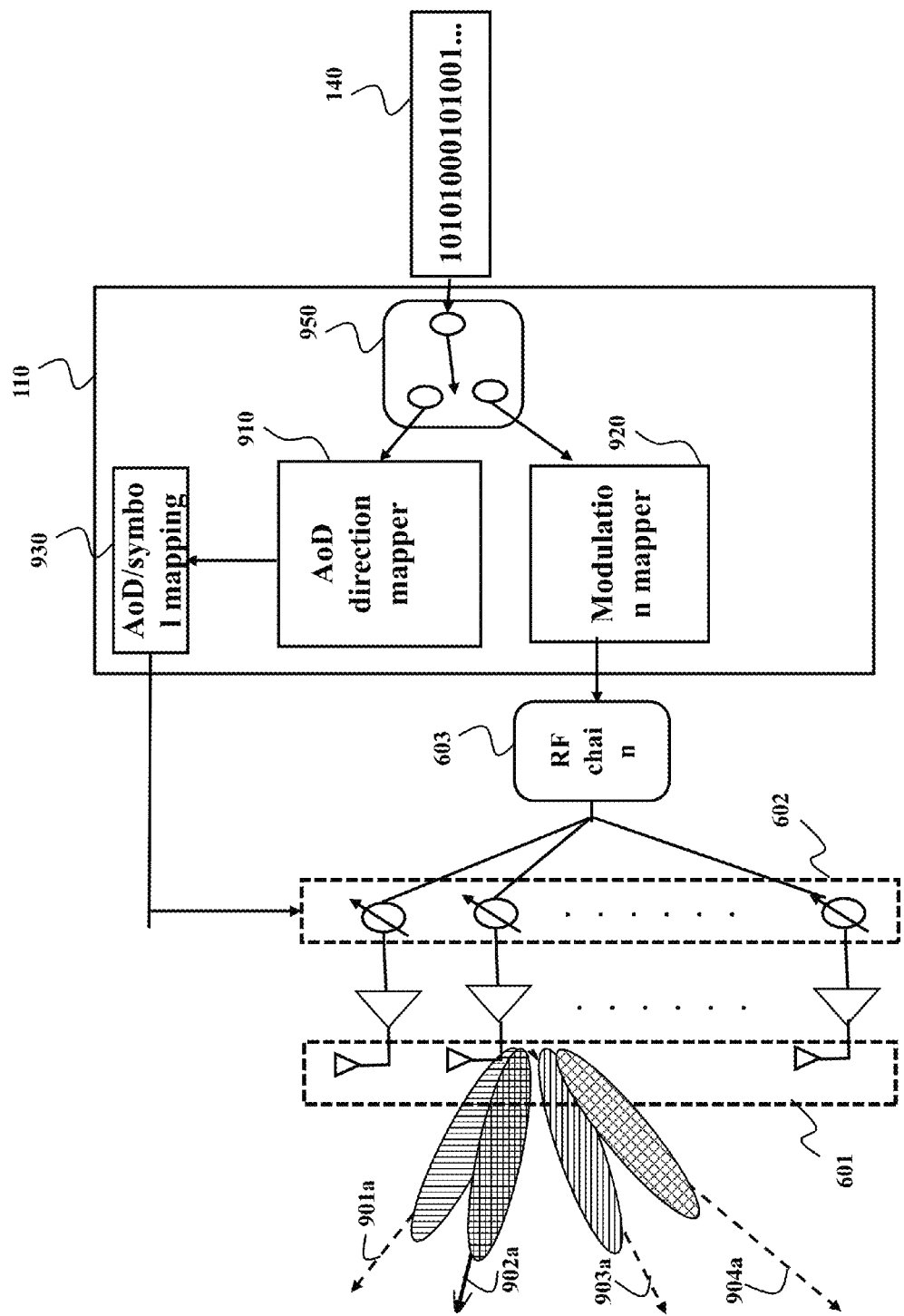
FIG. 9 shows a block diagram of exemplar implementation of a transmitter using spatial beamforming modulation according to one embodiment.

FIG. 9 shows a block diagram of exemplar implementation of a transmitter using spatial beamforming modulation according to one embodiment. The sequence of symbols received from the information interface 140 is decomposed by a switch 950 into at least two sequences. The first sequence is passed to a beamforming direction or AoD mapper 910 and the other sequence of symbols is passed to modulation mapper 920. Because there are additional degrees of freedom in the direction mapping, a part of input sequence is modulated on the available number of directions to increase the spectral efficiency. For example, four AoDs are selected based on their gains, $|\beta_1|^2 \geq |\beta_2|^2 \geq |\beta_3|^2 \geq |\beta_4|^2$, due to four RF chains at the receiver. These gains are available at the transmitter by channel estimation and corresponding AoDs, $\{\theta_1, \theta_2, \theta_3, \theta_4\}$ are available by the estimation and feedback. These available AoDs are used in forming the AoD-to-symbol mapping 930.

In this example, only one RF chain is used at the transmitter, so only one direction can be selected for the transmission at one transmission time. That is, the transmitter is able to generate only one transmission beam at each transmission time. For example, with one information data, 1010100010100101..., the embodiment first reshapes the data for QPSK modulation to information symbols. For example, the embodiment groups every $\log_2(N_s) + \log_2(M)$ bits, that is, (2+2) bits into one group, which can be possible by switch 950 as

| [$b_1$ $b_2$] | [$b_3$ $b_4$] |
|---|---|
| 1 0 | 1 0 |
| 1 0 | 0 0 |
| 1 0 | 1 0 |
| 0 1 | 0 1 |

Depending on two input bits [$b_1 b_2$], one azimuth AoD angle is determined as:

[0 0]: $a_t(\theta_1)$, [0 1]: $a_t(\theta_2)$, [1 0]: $a_t(\theta_3)$, [1 1]: $a_t(\theta_4)$ so that a precoding direction $p \in \{(a_t(\theta_1), a_t(\theta_2), a_t(\theta_3), a_t(\theta_4)\}$ is generated by the direction mapper 910.

In this example, the next two bits [$b_3$ $b_4$] is selected one of the symbols $$[0\ 0]: \frac{1+j}{\sqrt{2}}, [0\ 1]: \frac{1-j}{\sqrt{2}}, [1\ 0]: \frac{-1+j}{\sqrt{2}}, [1\ 1]: \frac{-1-j}{\sqrt{2}}$$

For example, the modulation mapper 920 uses an information symbol mapping $$s \in \left\{ \frac{1+j}{\sqrt{2}}, \frac{1-j}{\sqrt{2}}, \frac{-1+j}{\sqrt{2}}, \frac{-1-j}{\sqrt{2}} \right\}.$$

Thus, for the previous example, the following symbols are generated with accompanying directional angles.

These angles control the phase of a phase shifter array 602

| [$b_1 b_2$] | [$b_3 b_4$] | p | s | θ |
|---|---|---|---|---|
| 1 0 | 1 0 | $a_t(\theta_3)$ | $\frac{-1+j}{\sqrt{2}}$ | $\theta_3$ |
| 1 0 | 0 0 | $a_t(\theta_3)$ | $\frac{1+j}{\sqrt{2}}$ | $\theta_3$ |
| 1 0 | 1 0 | $a_t(\theta_3)$ | $\frac{-1+j}{\sqrt{2}}$ | $\theta_3$ |
| 0 1 | 0 1 | $a_t(\theta_2)$ | $\frac{1-j}{\sqrt{2}}$ | $\theta_2$ |

Without generating an actual symbol represented by [$b_1$, $b_2$], the receiver can infer them from the direction of transmission that represented by p at any time instance and save, e.g., two additional bits for transmissions. The phase shifter array 602 can be controlled to select only one directional beam 901a, 902a, 903a, or ... 904a. At each time, additional modulated symbol s is transmitted on the selected beam. Thus, for the previous example, the transmissions are accomplished as follows:

Time1: transmit $$\frac{-1+j}{\sqrt{2}}$$

in direction $\theta_3$ using beam $a_t(\theta_3)$

Time2: transmit $$\frac{1+j}{\sqrt{2}}$$

in direction $\theta_3$ using beam $a_t(\theta_3)$

Time3: transmit $$\frac{-1+j}{\sqrt{2}}$$

in direction $\theta_3$ using beam $a_t(\theta_3)$

Time4: transmit $$\frac{1-j}{\sqrt{2}}$$

in direction $\theta_2$ using beam $a_t(\theta_2)$

In some implementations, for M-ary constellation, $\log_2 M$ bits are used to determine which constellation point chosen, whereas $\log_2 N_s$ bits are used to determine which scattering cluster will be chosen for communications.

The received signal at the receiver is given by $$y=\sqrt{E}Hps+n$$

where E is the transmission power and n is the noise at the receiver. By substituting the channel matrix with the previous channel model, the received signal is given by $$y = \sqrt{E}\,Hps + n = \sqrt{E}\sum_{l=1}^{N_{T_s}}\beta_l a_r(\phi_l) a_t(\theta_l)^H ps + n$$

Based on the previous example, the received signal y, 750, becomes $$\text{Time1}: y = \sqrt{E}\,Hps + n = \sqrt{E}\,\beta_3 a_r(\phi_3)\frac{-1+j}{\sqrt{2}} + n$$

$$\text{Time2}: y = \sqrt{E}\,\beta_3 a_r(\phi_3)\frac{1+j}{\sqrt{2}} + n$$

$$\text{Time3}: y = \sqrt{E}\,\beta_3 a_r(\phi_3)\frac{1+j}{\sqrt{2}} + n$$

$$\text{Time4}: y = \sqrt{E}\,\beta_2 a_r(\phi_2)\frac{1-j}{\sqrt{2}} + n$$

At the receiver side, the receiver combines the received signal via phase shifters. The maximum ratio combining (MRC) may be used as the optimal combiner. This makes the receiver beam point to the scattering cluster that corresponds to the transmitted direction. Since $N_s \leq N$, where $N_s$ denotes the number of selected AoD, $N_s$ transmission directions are possible to be used and one direction is selected by the transmitter, the receiver needs to detect an unknown direction used by the transmitter.

The receiver can use outputs $\{r_1, \ldots, r_{N_s}\}$ of the phase shifters 702, 712 outputs of FIG. 7. Then the combining process is formed in by the beamformer 720 as:

$$y_c = \begin{bmatrix} r_1^H y \\ r_2^H y \\ \vdots \\ r_{N_s}^H y \end{bmatrix} = \begin{bmatrix} a_r(\phi_1)^H y \\ a_r(\phi_2)^H y \\ \vdots \\ a_r(\phi_{N_s})^H y \end{bmatrix}$$

and the kth element of $y_c$ as $y_c(k)=a_r(\theta_k)^H y$.

Since signal $y_c$ is a function of two unknown symbols p and s, the receiver uses a joint detector 730 to decide them by minimizing the following metric:

$$\{\hat{k}, \hat{s}\} = \arg\min_{s, k \in \{1, \ldots, N_s\}} |y_c(k) - a_r(\phi_k)^H \sqrt{E}\,Ha_t(\theta_k)s|^2.$$

After detection process, $\hat{k}$ and $\hat{s}$ can be detected, so that eventually transmitted information bits $[\hat{b}_1, \hat{b}_2]$ and $[\hat{b}_3, \hat{b}_4]$ can be inferred from k and s, respectively. The above maximum-likelihood detection can be relaxed by various low-complexity methods such as minimum mean-square error and sphere decoding.

Adaptive Transmission

Figure 10:
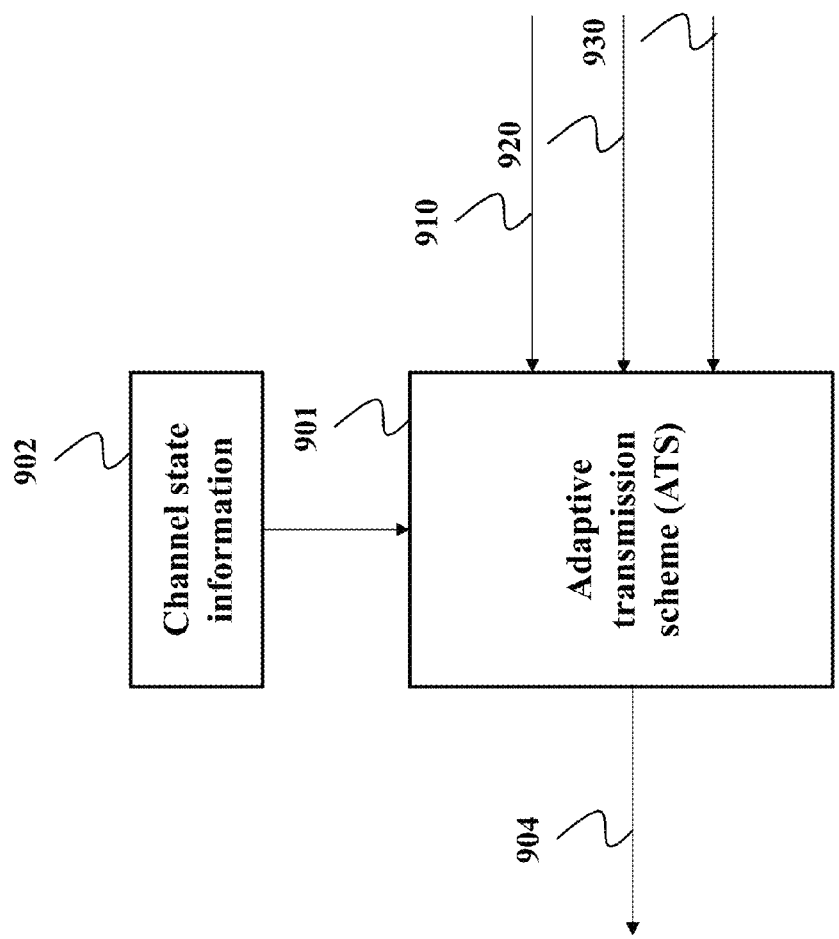
FIG. 10 shows a schematic of an adaptive transmission scheme used by some embodiments.

FIG. 10 shows a schematic of an adaptive transmission scheme used by some embodiments. The adaptive transmission scheme 901 is based on recognition that when the channel gains vary for different AoDs, the spatial beamforming for strongly fading channels can be suboptimal. To that end, in one embodiment, the transmitter selects a type of modulation 904 from different types of modulations 910, 920, and 930 based on channel estimation 902 performed by the receiver. For example, based on the instantaneous channel state information $\beta_l$, $l=1, \ldots N_s$, 602, the adaptive transmission scheme (ATS), 901, calculates an instantaneous bit error rate (BER) based on the orthogonal channel model, and then selects type of modulation 904 with smallest instantaneous BER.

Examples of different types of modulations include a full spatial beamforming modulation (FSBM) 910, a partial spatial beamforming modulation (PSBM) 920, and maximum spatial beamforming modulation (MSBM) 930. For example, the FSBM is used for four AoDs that can ass additional two bits in the transmission; the PSBM is used with two AoDs to add one additional bit per transmitted symbol and MSBM is used with all available AoDs. For example, different types of the modulation can be selected based on a number of AoDs specified in the mapping by the receiver as a result of channel estimation.

Additionally, or alternatively, in one embodiment, the number of AoDs to use for modulation can be scaled to any arbitrary integer numbers, which are also a variable to adapt in accordance to the instantaneous channel state information. In this ATS, the symbol constellation and AoDs are jointly assigned to minimize BER.

In yet another embodiment, instead of minimizing BER, the bits and path assignments are determined to maximize the data throughput. This embodiment can solve the issue that the BER performance for different bits allocated to spatial domain and constellation domain can be significantly different. Rather than minimizing the averaged BER for different bits, the ATS uses throughput calculation. For example, the throughput is calculated from block error rate for each bit. For another example, the throughput is calculated by general mutual information, which is obtained by soft-decision likelihood histogram of the demodulator output.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A transmitter, comprising:
   a plurality of antennas for beamforming with different angles of departure (AoD);
   an information interface to receive a sequence of symbols including a first symbol and a second symbol; and
   a modulator to cause the plurality of antennas to form a transmission beam with an AoD selected according to a value of the first symbol and to modulate the transmission beam according to a value of the second symbol, wherein the modulator causes the plurality of antennas to perform pilot transmission with transmission beams having different AoDs to enable at least one receiver to estimate a pattern of arrival impinging upon antennas of the receiver for different transmission beams.

2. The transmitter of claim 1, wherein at least some AoDs include azimuths and altitudes angles, wherein the modulator selects an azimuth angle and an altitude angle of the AoD based on the value of the first symbol.

3. The transmitter of claim 1, wherein each pilot transmission beam includes an index of the AoD.

4. The transmitter of claim 1, further comprising:
   a memory to store a mapping between different AoDs and values of the symbols, wherein the mapping is received from the receiver in response to performing the pilot transmission.

5. The transmitter of claim 4, wherein the modulator varies a type of modulation based on a number of AoDs specified in the mapping.

6. The transmitter of claim 1, further comprising:
   a radio frequency (RF) chain to convert the modulated value of the second symbol into a RF signal of a predetermined frequency; and
   a set of phase shifters to provide a controllable phase shift of transmission of the RF signal via the plurality of antennas that forms the transmission beam having the selected AoD.

7. The transmitter of claim 6, further comprising:
   a set of amplifiers for amplifying the RF signal as a function of a gain of a channel formed by the transmission beam with the selected AoD.

8. The transmitter of claim 1, wherein a frequency of each transmission beam is within a Millimeter wave (mmWave) spectrum.

9. A receiver in communication with the transmitter of claim 1, wherein the transmitter transmits the transmission beam to the receiver, wherein the receiver comprises:
   a set of antennas to receive the transmission beam transmitted by the transmitter according to the selected AoD;
   a processor to estimate an angle of arrival (AoA) of the received transmission beam; and
   a decoder to decode the second symbol modulated in the transmission beam and to decode the first symbol based on the AoA.

10. The receiver of claim 9, wherein the set of antennas receives pilot transmission beams transmitted over a Millimeter wave (mmWave) channel, wherein the processor determines channel state information (CSI) of the mmWave channel using a Bayesian inference on each pilot transmission beam according to a probabilistic model of the mmWave channel including statistics on paths and spread of mmWaves propagating in the mmWave channel and determines, using the CSI, a mapping between different AoDs and values of the symbols, further comprising:
    a transceiver to transmit the mapping to the transmitter.

11. A method for transmitting symbols over a wireless communication channel, comprising:
    receiving a sequence of symbols including a first symbol and a second symbol;
    selecting an angle of departure (AoD) based on a value of the first symbol;
    modulating a radio frequency (RF) signal according to a value of the second symbol; and
    performing a beamforming to transmit the RF signal as a transmission beam with the selected AoD, wherein the method uses a processor coupled to a memory storing a mapping between indices of different AoDs and values of the symbols, wherein the processor is coupled with stored instructions implementing the method, wherein the instructions, when executed by the processor carry out at least some steps of the method.

12. The method of claim 11, wherein the AoD includes an azimuth angle and an altitudes angle selected based on the value of the first symbol.

13. The method of claim 11, further comprising:
    performing a pilot transmission with a receiver with transmission beams having different AoDs to enable the receiver to estimate a pattern of arrival impinging upon antennas of the receiver for different transmission beams; and
    receiving, in response to the pilot transmission, a mapping between indices of different AoDs and values of the symbols, such that the selecting is performed based on the mapping.

14. The method of claim 13, further comprising:
varying the modulating based on a number of AoDs specified in the mapping.

15. The method of claim 13, wherein the wireless communication channel has a Millimeter wave (mmWave) spectrum.

16. A non-transitory computer readable storage medium embodied thereon a program executable by a processor for performing a method, the method comprising:
receiving a sequence of symbols including a first symbol and a second symbol;
selecting an angle of departure (AoD) based on a value of the first symbol;
modulating a radio frequency (RF) signal according to a value of the second symbol;
performing a pilot transmission with a receiver with transmission beams having different AoDs to enable the receiver to estimate a pattern of arrival impinging upon antennas of the receiver for different transmission beams;
receiving, in response to the pilot transmission, a mapping between indices of different AoDs and values of the symbols, such that the selecting is performed based on the mapping;
varying the modulating based on a number of AoDs specified in the mapping; and
performing a beamforming to transmit the RF signal as a transmission beam with the selected AoD.

17. The storage medium of claim 16, wherein a frequency of each transmission beam is within a Millimeter wave (mmWave) spectrum.

18. A communication system including a transmitter and a receiver in communication with each other, wherein the transmitter comprises:
a plurality of antennas for beamforming with different angles of departure (AoD);
an information interface to receive a sequence of symbols including a first symbol and a second symbol; and
a modulator to cause the plurality of antennas to form a transmission beam with an AoD selected according to a value of the first symbol and to modulate the transmission beam according to a value of the second symbol; and wherein the receiver comprises:
a set of antennas to receive the transmission beam transmitted by the transmitter according to the selected AoD;
a processor to estimate an angle of arrival (AoA) of the received transmission beam, wherein the set of antennas receives pilot transmission beams transmitted over a Millimeter wave (mmWave) channel, wherein the processor determines channel state information (CSI) of the mmWave channel using a Bayesian inference on each pilot transmission beam according to a probabilistic model of the mmWave channel including statistics on paths and spread of mmWaves propagating in the mmWave channel and determines, using the CSI, a mapping between different AoDs and values of the symbols;
a transceiver to transmit the mapping to the transmitter; and
a decoder to decode the second symbol modulated in the transmission beam and to decode the first symbol based on the AoA.

* * * * *